United States Patent [19]

Kako et al.

[11] Patent Number: 5,400,168
[45] Date of Patent: Mar. 21, 1995

[54] ELASTIC MEMBER SUPPORT STRUCTURE

[75] Inventors: Mitsumasa Kako, Tokai; Hiroyuki Kashima, Nagoya, both of Japan

[73] Assignee: Brother Kogyo Kabushiki Kaisha, Nagoya, Japan

[21] Appl. No.: 109,915

[22] Filed: Aug. 23, 1993

[30] Foreign Application Priority Data

Nov. 19, 1992 [JP] Japan .......................... 4-080023 U

[51] Int. Cl.6 ............................................ G02B 26/08
[52] U.S. Cl. ...................................... 359/198; 359/819; 359/827
[58] Field of Search ............... 359/819, 205, 206, 207, 359/208, 198, 811, 827, 818, 828, 717

[56] References Cited

U.S. PATENT DOCUMENTS

| 4,869,582 | 9/1989 | Nakajima et al. | 359/871 |
| 5,162,938 | 11/1992 | Iima et al. | 359/206 |

FOREIGN PATENT DOCUMENTS

| 2204711 | 8/1990 | Japan | 359/206 |
| 4265919 | 9/1992 | Japan | 359/819 |

Primary Examiner—Loha Ben
Assistant Examiner—Thomas Robbins
Attorney, Agent, or Firm—Oliff & Berridge

[57] ABSTRACT

A supporting member made of elastomer materials is inserted with pressure into a chassis, and a support portion projects inside the chassis. The supporting member supports the ends of the convex lens and concave lens.

21 Claims, 4 Drawing Sheets

ELASTIC MEMBER SUPPORT STRUCTURE

BACKGROUND OF THE INVENTION

1. Field of the Invention

The invention relates to a support structure that supports the elastic member, and more particularly, relates to the support structure where the elastic member is positioned and is fixed by using elastomer materials.

2. Description of the Related Art

Conventionally, the elastic member is supported in a scanner unit of a laser printer as shown in FIG. 4. The lens 101, which is made of resin, or made of glass is positioned on a standard side 100a of a chassis 100 formed with the resin material including the glass fiber by using resilient plate springs 102.

The female screw 105, which is made of metal, must be inserted into the chassis 100 in order to fix the plate spring 102 so that lens 101 is supported and biased by the plate springs 102. It prevents lens 101 from becoming unstable based on sagging of the screw. However, a lot of time is needed and trouble occurs for such assembly. In addition, the manufacturing process increases because the shape of the plate springs 102 is complicated to give an appropriate spring biasing to lens 101, resulting in increased cost of the scanner unit.

In addition, where the lens is made of resin, a new device is needed to prevent the damage of the lens.

SUMMARY OF THE INVENTION

The object of the invention is to provide the elastic support structure with simple structure, easy assembly and low-cost.

The elastic member support structure comprises a fundamental portion having a basic side, an elastic member supported on said fundamental portion and a support member made of elastic materials fixed to said fundamental portion, said support member supporting and positioning said elastic member on the basic side of said fundamental portion by utilizing the elasticity of the elastic materials.

In the elastic member support structure, the support member is molded with elastomer materials and is able to support the elastic member composed of a complex shape more easily. The support member supports and positions the elastic member on the basic side of the fundamental portion.

In the elastic member support structure of the present invention, the support member is molded with elastomer materials, and the lens 101, made of the resin (elastic member), is supported by using the elastic biasing of the elastomer materials so that the assembly process is simplified and the saving cost is led efficiently.

Further, it is possible to accommodate for heat expansion of the resin lens.

Moreover, the resin lens is not only protected from damage, but there is an effect that vibration is reduced and noise is decreased.

BRIEF DESCRIPTION OF THE DRAWINGS

A preferred embodiment of the invention will be described in detail with reference to the following figures, wherein.

DETAILED DESCRIPTION OF PREFERRED EMBODIMENTS

Hereafter, the invention is described with reference to the drawings in connection with a preferred embodiment.

Figure 1:
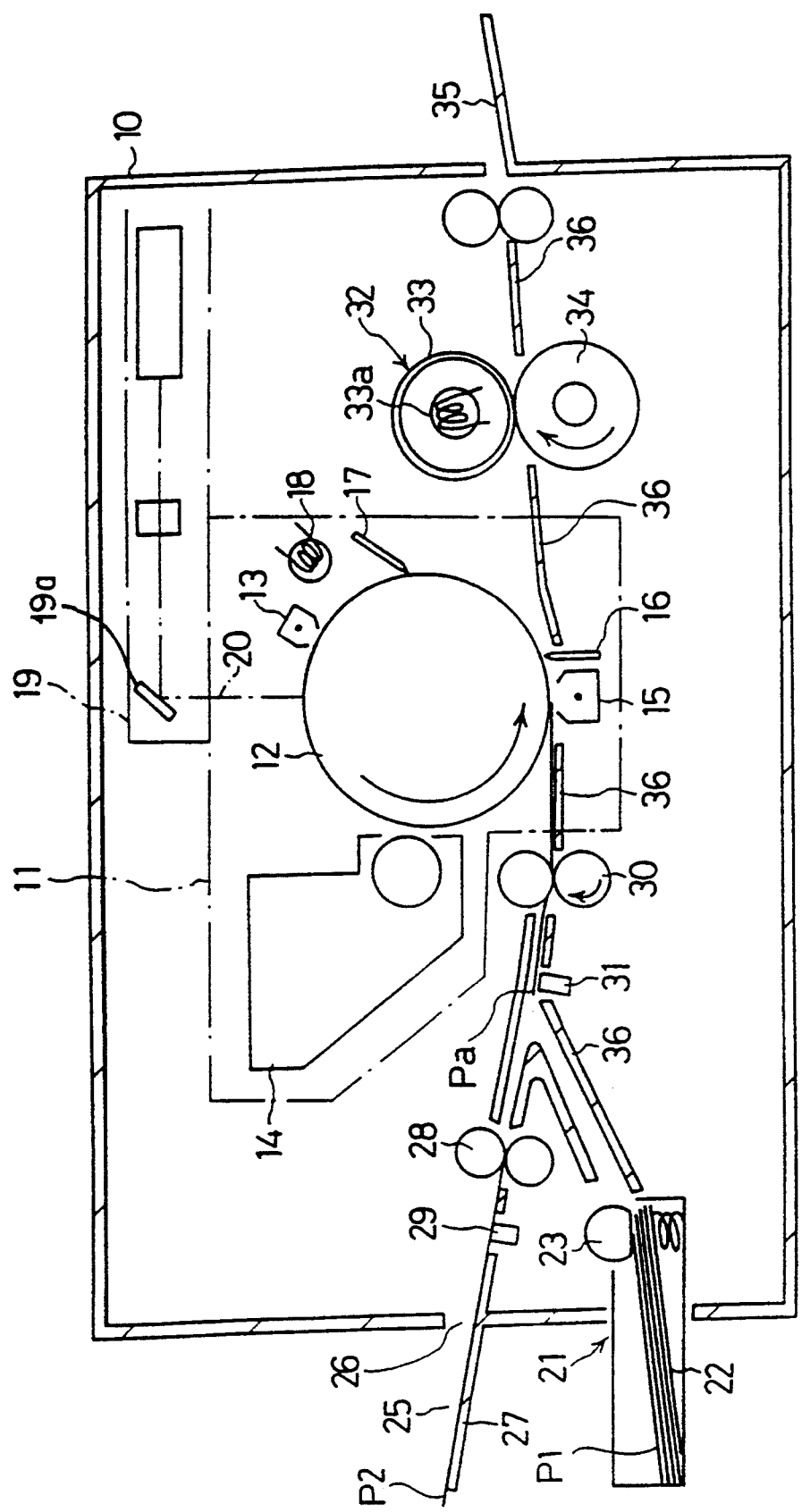
FIG. 1 is a explanatory view that shows the brief construction of the laser printer showing an embodiment of the present invention.

FIG. 1 is an explanatory view that shows the construction of the laser printer showing an embodiment of the present invention.

A print unit 11 is provided at the center of laser printer body 10. Photosensitive drum 12 is installed at the center of print unit 11. Photosensitive drum 12 is rotatably supported. In surroundings of photosensitive drum 12, electrical charger 13, development device 14, transcript charger 15, divisional brush for removing electric charges 16, cleaning device 17 and preexposure lamp 18 are installed in order. Above the photosensitive drum 12, scan optics unit 19 (scanner unit), which includes the laser luminescence lens and the polygon mirror are installed. Laser beam 20 is irradiated on the surface of photosensitive drum 12 by scan optics unit 19.

Automatic feed means 21 is installed under the left end of laser printer body 10. The automatic feed means 21 comprises cassette 22 that accommodates a stack of regular sheets P1 and separation roller 23. Separation roller 23 contacts with regular sheet P1 in an uppermost position in cassette 22 and separates it from other regular sheets P1 and sends it to the resist roller 30 described later.

A manual insertion sheet supplying means 25 is installed above automatic feed means 21. The manual insertion sheet supplying means 25 includes a manual insertion entrance 26, a manual insertion guide 27, a feeding roller 28 and a manual insertion sensor 29. The manual insertion entrance 26 is installed in the left side of the laser printer body 10. The manual insertion guide 27 projecting from the bottom of manual insertion entrance 26 guides the manually inserted sheet P2 to the feeding roller 28 described later. The feeding roller 28 sends the manual inserted sheet P2 inserted in manual insertion entrance 26 to the resist roller 30. The manual insertion sensor 29 installed between the manual insertion entrance 26 and the feeding roller 28 detects the presence of manual inserted sheet P2 installed in laser printer body 10.

Between the automatic insertion means 21 and the manual insertion sheet supplying means 25, and print unit 11, the resist roller 30 is rotatably installed. Resist roller 30 transports regular sheet P1 sent from automatic feed means 21 or the manual inserted sheet P2 sent from the manual insertion sheet supplying means 25 into print unit 11.

Resist sensor 31 is installed at a position Pa, which is just before the installed position of the resist roller 30 from the feed direction (this position Pa is called a standby position from now on), and the resist sensor 31 detects the existence of the regular sheet P1 sent from automatic feed means 21 or the manually inserted sheet P2 sent from the manual insertion sheet supplying means 25. Resist sensor 31 detects the existence of the regular sheet P1 or the manually inserted sheet P2 in standby position Pa.

A heat fixing unit 32 is installed downstream of the sheet feeding direction in the print unit 11. The heat fixing unit 32 includes a heat roller 33, which is heated by a heat source 33a, and a roller 34, which contacts the heat roller 33. Downstream of the sheet feeding direction from the heat fixing unit 32, a discharging tray 35, which accommodates the printed regular sheet P1 or the printed manually inserted sheet P2 is installed, projecting from the right end side of the laser printer body 10. The sheet guide plate 36 is formed in parts connected between roller 23 and feeding roller 28, resist roller 30, print unit 11, heat fixing unit 32 and discharging tray 35.

Figure 2:
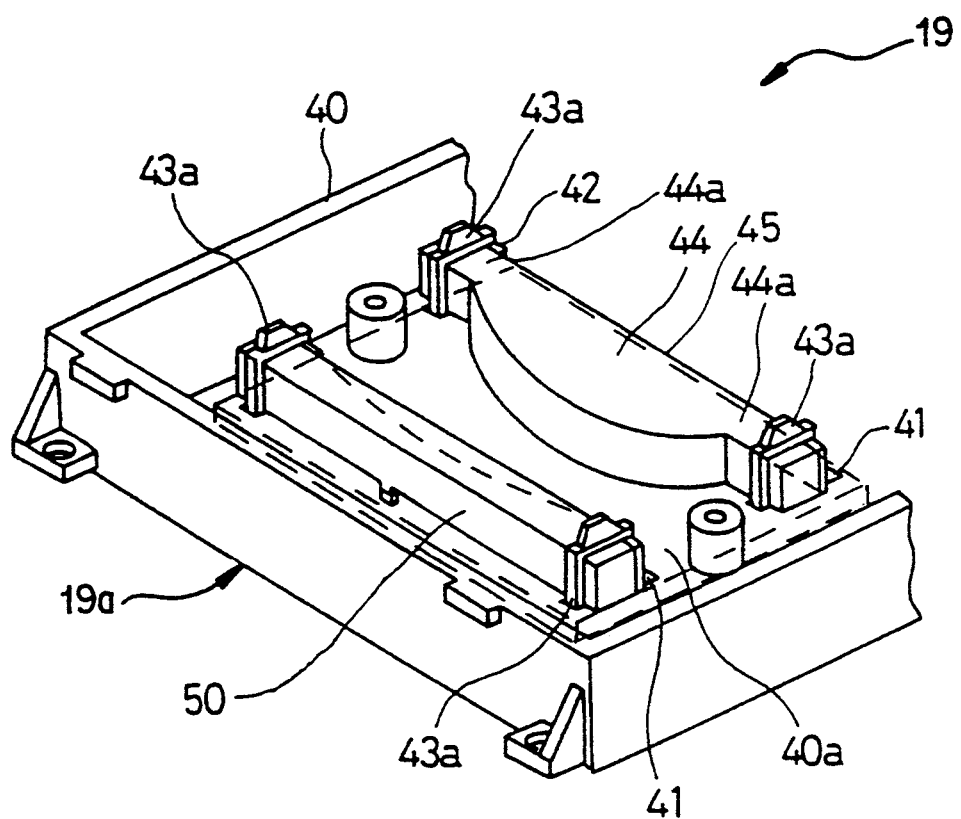
FIG. 2 is a perspective view that shows a part of the scan optics unit.
Figure 3:
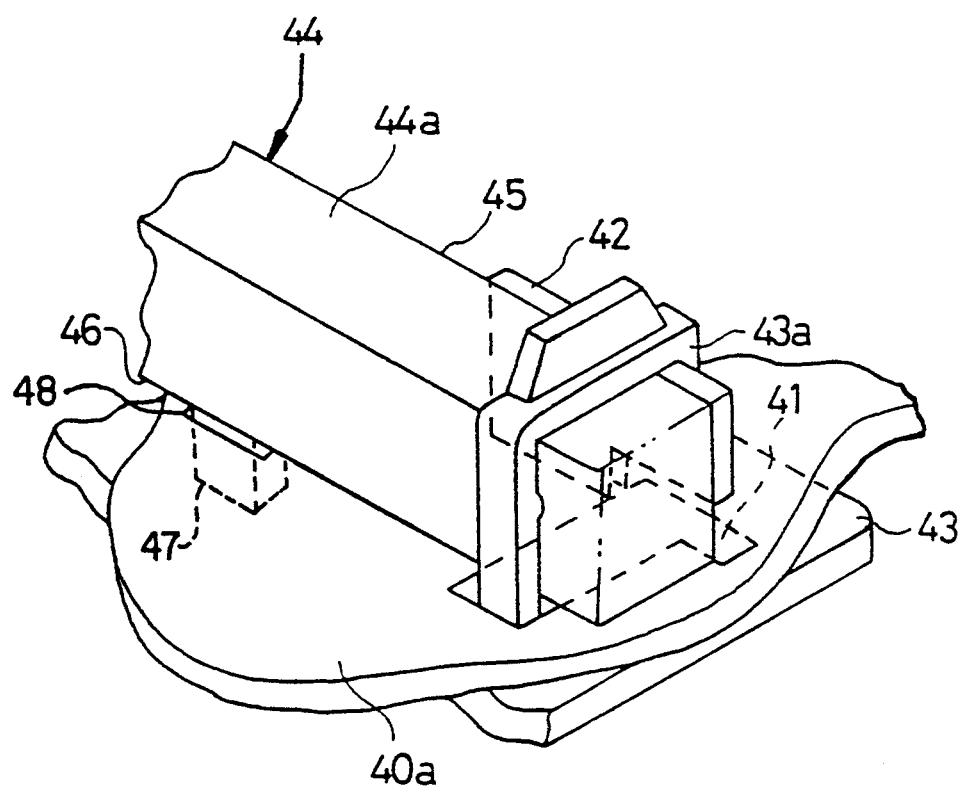
FIG. 3 is an enlarged explanatory view that shows the relation in which the end portion of the concave lens and the support portion is assembled.
Figure 4:
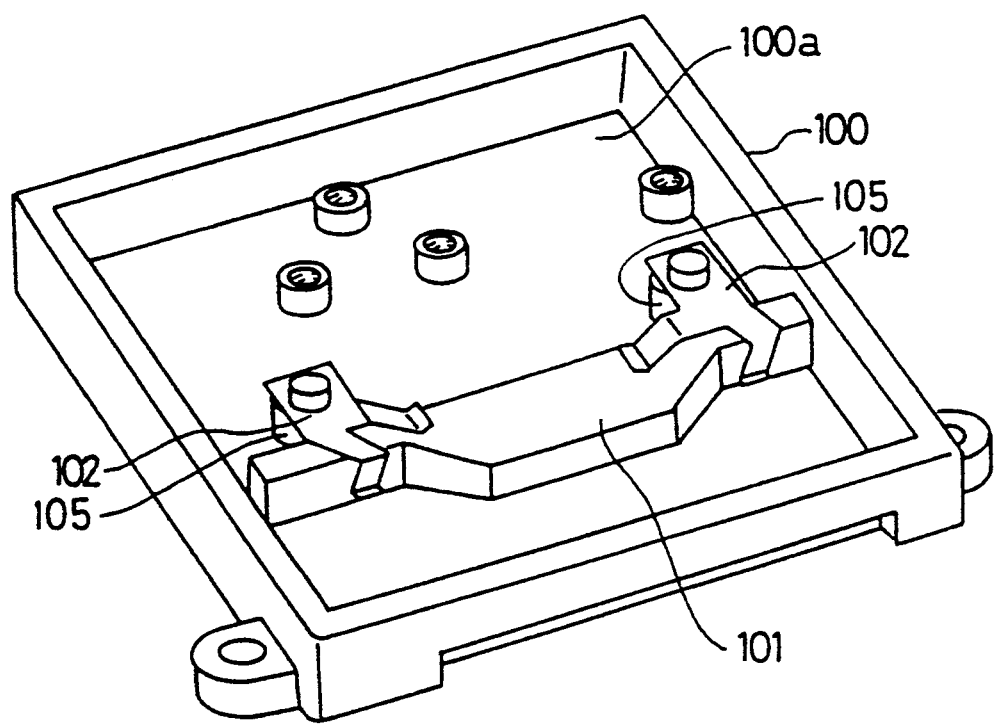
FIG. 4 is an explanatory view that shows the lens support structure of the prior art scanner unit.

FIG. 2 is a perspective view that shows a part 19a of the scan optics unit 19, and FIG. 3 is an expansion explanatory view that shows the relation in which the end portion of the concave lens and the support portion is assembled.

A chassis 40 is made of resin. A penetration hole 41 is installed through a bottom 40a and a positioning unit 42 is installed projecting above from the bottom 40a. Support portion 43a is molded and is installed on a support member 43 made of polyethylene terephthalate.

Support portion 43a of the support member 43 is inserted from the lower side of the bottom 40a through the penetration hole 41. At this time, the positioning unit 42 is located inside of the support portion 43a as shown in FIG. 3. That is, the support portion 43a is inserted in the penetration hole 41 transforming elasticity of the support portion 43a itself and locates the positioning unit 42 inside of the support portion 43a.

A projection portion 47, which projects downward in the center of a convex lens 44 made of resin, is inserted in a hole 48 in the bottom 40a of chassis 40. Therefore, the convex lens 44 is fixed to the bottom 40a of chassis 40 and prevented from movement in a longitudinal direction between support portions 43a. Each of the support portions 43a of the support member 43 that project from the bottom 40a and both ends 44a of the convex lens 44 are inserted with pressure into each of the support portions 43a as shown in FIG. 3.

Support portions 43a support both ends 44a with elasticity such that both rear sides 45 of the both ends 44a contact the positioning units 42 with pressure and lower sides 46 contact the surface of bottom 40a of the chassis 40, that is, standard side. As for the convex lens 44 made of resin, the expansion of the convex lens 44 is absorbed by the support portions 43a and support condition of the convex lens 44 is certainly maintained even if the convex lens 44 is expanded based on heat by the heat source 33a. A detailed explanation of a concave lens 50 made of resin is omitted because the support structure of the concave lens 50 is similar to the convex lens 44 mentioned above.

While the embodiments disclosed herein are preferred, it will be appreciated from this teaching that various alternatives, modifications, variations or improvements therein may be made by those skilled in the art that are within the scope of the invention, which is defined by the following claims.

What is claimed is:

1. A support for an elastic member of a lens in a laser printer, and the support comprising:

a support member having a first surface and a first apertured portion;

a support portion having a second apertured portion, said support portion extending beyond said first surface of said support member through said first apertured portion, a positioning unit disposed in said second apertured portion, said lens being disposed in said second apertured portion with said positioning unit wherein said support portion is formed of an elastic material, said support portion being adapted to elastically urge said lens against said positioning unit.

2. The support according to claim 1, further comprising a projection portion attached to said lens, said projection portion extending into a third apertured portion in said support member.

3. The support according to claim 1, wherein said lens is made of resin.

4. The support according to claim 3, wherein said lens is a convex lens.

5. The support according to claim 3, wherein said lens is a concave lens.

6. The support according to claim 1, wherein said support member is made of resin.

7. The support according to claim 6, wherein said support member is made of polyethylene terephthalate.

8. A support structure for supporting an elastic member, comprising:

a fundamental portion having a basic side; and a support member made of elastic materials fixed to said fundamental portion, said support member supporting and positioning said elastic member on the basic side of said fundamental portion by utilizing the elasticity of the elastic materials.

9. The support structure according to claim 8, further comprising a projection portion and an aperture in said fundamental portion, said projection portion being fixed to an underside of said elastic member and extending into the aperture in said fundamental portion.

10. The support structure according to claim 8, wherein said support member comprises a support portion and a positioning unit disposed adjacent said elastic member, wherein the elasticity of said support portion urges said elastic member against said positioning unit.

11. The support structure according to claim 8, wherein said support member comprises a support portion and a positioning unit, said support portion comprising a first apertured portion, said positioning unit being disposed adjacent said elastic member in the first apertured portion, and wherein said fundamental portion comprises a second apertured portion, said support portion being disposed through the second apertured portion, the elasticity of said support portion through the second apertured portion urging said elastic member against said positioning unit in the first apertured portion.

12. The support structure according to claim 8 wherein at least two support members support said elastic member on opposite ends thereof and each of said support members includes an apertured portion, said opposite ends of said elastic member being inserted in the apertured portions of said support members with pressure.

13. The support structure according to claim 8, wherein said support member comprises a support portion and a positioning unit, said support portion comprising a first apertured portion, said positioning unit being disposed adjacent said elastic member in the first apertured portion, and wherein said elastic member comprises a rear side and a lower side, the rear side of said elastic member being urged against said positioning unit by said support portion and the lower side of said elastic member being urged against the basic side by said support portion.

14. An optical apparatus comprising:
a fundamental portion having a basic side;
an optical resin member supported on said fundamental portion and arranged in a light path; and
a support member made of elastic materials including a support portion, said support portion supporting said optical resin member biased toward the basic side of said fundamental portion and fixing said optical resin member to said fundamental portion.

15. The optical apparatus as claimed in claim 14, wherein said fundamental portion comprises a hole and wherein said support member is fixed to said fundamental portion through the hole with pressure.

16. The optical apparatus according to claim 14, further comprising a projection portion and an aperture in said fundamental portion, said projection portion being integral with an underside of said optical resin member and extending into the aperture in said fundamental portion.

17. The optical apparatus according to claim 14, wherein said support member comprises a positioning unit and said support portion comprises a first apertured portion, said positioning unit being disposed adjacent a rear side of said optical resin member, and wherein said fundamental portion includes a second apertured portion, said support portion being disposed through the second apertured portion, the elasticity of said support portion through the second apertured portion urging said elastic member against said positioning unit in the first apertured portion.

18. The optical apparatus according to claim 14, wherein at least two support members support said optical resin member on opposite ends thereof and each of said support members includes an apertured portion, said opposite ends of said optical resin member being inserted in the apertured portions of said support members with pressure, thereby being fixed to said fundamental portion.

19. The optical apparatus according to claim 14, wherein said support portion comprises a first apertured portion, and wherein said optical resin member comprises a rear side and a lower side, said support member comprising a positioning unit disposed adjacent the rear side of said optical resin member, the rear side of said optical resin member being urged against said positioning unit by said support portion and the lower side of said optical resin member being urged against the basic side by said support portion.

20. A support for an elastic member of a lens in a laser printer, the support comprising:
a support member having a first surface and a first apertured portion;
a support portion having a second apertured portion, said support portion extending beyond the first surface of said support member through said first apertured portion, said support portion being formed of an elastic material;
a positioning unit disposed in said second apertured portion, said lens being disposed in said second apertured portion with said positioning unit, said support portion being adapted to elastically urge said lens against said positioning unit.

21. A support for an elastic member of a lens in a laser printer, the support comprising:
a support member having a first surface and a first apertured portion, said support member being made of polyethylene terephthalate;
a support portion having a second apertured portion, said support portion extending beyond the first surface of said support member through said first apertured portion, said support portion being formed of an elastic material;
a positioning unit disposed in said second apertured portion, said lens being disposed in said second apertured portion with said positioning unit, said support portion being adapted to elastically urge said lens against said positioning unit.

* * * * *